United States Patent
Roskind et al.

(10) Patent No.: US 9,641,343 B1
(45) Date of Patent: May 2, 2017

(54) EFFICIENT UNIFIED CERTIFICATE REVOCATION LISTS

(75) Inventors: James Roskind, Redwood City, CA (US); Mike Belshe, Saratoga, CA (US); Wan-Teh Chang, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 666 days.

(21) Appl. No.: 13/466,698

(22) Filed: May 8, 2012

Related U.S. Application Data

(60) Provisional application No. 61/578,082, filed on Dec. 20, 2011.

(51) Int. Cl.
*H04L 29/06* (2006.01)
*H04L 9/32* (2006.01)

(52) U.S. Cl.
CPC .................................. *H04L 9/3268* (2013.01)

(58) Field of Classification Search
CPC ..................................................... H04L 9/3268
USPC ......................................................... 713/158
See application file for complete search history.

(56) References Cited

U.S. PATENT DOCUMENTS

| | | | |
|---|---|---|---|
| 5,793,868 A * | 8/1998 | Micali | 380/28 |
| 6,044,462 A | 3/2000 | Zubeldia et al. | |
| 6,134,551 A * | 10/2000 | Aucsmith | |
| 6,487,658 B1 * | 11/2002 | Micali | 713/158 |
| 7,634,816 B2 | 12/2009 | Alkove et al. | |
| 7,698,549 B2 | 4/2010 | Thornton et al. | |
| 8,543,824 B2 | 9/2013 | Louch et al. | |
| 2002/0004773 A1* | 1/2002 | Xu et al. | 705/36 |
| 2005/0193204 A1 | 9/2005 | Engberg et al. | |
| 2005/0228998 A1* | 10/2005 | Chan | H04L 9/3268 713/175 |
| 2008/0126378 A1* | 5/2008 | Parkinson et al. | 707/101 |
| 2010/0122081 A1* | 5/2010 | Sato | H04L 9/0891 713/158 |

OTHER PUBLICATIONS

Giovanni, Golomb-coded sets: smaller than Bloom filters, Sep. 4, 2011, Giovanni Bajo's at http://giovanni.bajo.it/post/47119962313/golomb-coded-sets-smaller-than-bloom-filters.*
Belshe et al., Chromium Code Reviews, available at https://codereview.chromium.org/6965015, (Jun. 2, 2011), 3 pages.
Belshe, et al., DIFF of crl_filter.cc, available at https://codereview.chromium.org/download/issue6965015_7001.diff, (Jun. 2, 2011), 18 pages.

* cited by examiner

*Primary Examiner* — Ellen Tran
(74) *Attorney, Agent, or Firm* — McDermott Will & Emery LLP

(57) ABSTRACT

Systems and methods for generating a unified certificate revocation list (UCRL) are provided. A method for generating a unified certificate revocation list includes identifying revocation servers associated with public key certificates. The method also includes aggregating server information of the identified revocation servers into revocation server lists (RSLs). The method further includes combining revoked certificates of the RSLs into a unified certificate revocation list (UCRL). The method also includes compressing the UCRL into a compressed UCRL. Lossy compression may be used. Compressed UCRLs may be used to test for revocation status. A system for generating a unified certificate revocation list includes a revocation server identifier, a revocation server list generator and a UCRL filter.

27 Claims, 5 Drawing Sheets

EFFICIENT UNIFIED CERTIFICATE REVOCATION LISTS

CROSS-REFERENCE TO RELATED APPLICATIONS

This application claims the benefit of U.S. Provisional Application No. 61/578,082 filed Dec. 20, 2011, which is incorporated herein by reference in its entirety.

BACKGROUND

Field

The field relates to web browsers, web applications and online certificates.

Background

Certificates, such as public key and private key certificates, may be used to provide trusted Internet communications. However, certificates may expire or be revoked. Certain protocols, such as Online Certificate Status Protocol (OCSP) may be used to obtain certificate status information, such as whether a certificate is valid or if it has been revoked.

Certificates are validated, as having not been revoked, by contacting a specified revocation server and checking for the presence of the certificate revocation in a certificate revocation list (CRL). Most implementations of certificate validation, such as implemented in current web browsers, "wait" to receive the certificate revocation status. Such implementations may give up after a certain period of time. This wait time can delay a user, causing discomfort. Worse yet, this wait time can undermine public key infrastructure (PKI) validation. An attacker with a revoked certificate can launch a denial-of-service attack against a revocation server and block visibility of a revocation.

BRIEF SUMMARY

The embodiments described below relate to systems and methods for generating a unified certificate revocation list (UCRL). According to an embodiment, a method for generating a unified certificate revocation list includes obtaining public key certificates and identifying revocation servers associated with the public key certificates. The method also includes aggregating server information of the identified revocation servers into revocation server lists (RSLs). The method further includes combining revoked certificates of the RSLs into a UCRL. The method also includes compressing the UCRL into a compressed UCRL. Lossy compression may be used.

According to another embodiment, a method for determining certificate revocation status includes obtaining a compressed UCRL having revoked certificates combined from RSLs. The method further includes comparing a current certificate to the compressed UCRL to determine revocation status for the current certificate. The method also includes establishing a connection corresponding to the current certificate when a revocation of the current certificate is not found in the compressed UCRL.

According to an embodiment, a system for generating a unified certificate revocation list includes a revocation server identifier configured to obtain public key certificates and identify revocation servers from the public key certificates. The system also includes a revocation server list generator configured to aggregate server information of the identified revocation servers into RSLs. The revocation server list generator is further configured to combine the revoked certificates of the RSLs into a UCRL. The system further includes a UCRL filter configured to compress the UCRL into a compressed UCRL.

According to another embodiment, a system for determining certificate revocation status includes a UCRL manager configured to obtain a compressed UCRL having revoked certificates combined from one or more RSLs. The system further includes a UCRL comparator configured to compare a certificate to the compressed UCRL to determine revocation status for the current certificate. A connection corresponding to the current certificate is established when revocation of the current certificate is not found in the compressed UCRL.

According to an embodiment, a computer readable storage medium having control logic stored therein that, when executed by a processor, causes the processor to generating a unified certificate revocation list. The control logic includes a first computer readable program code to cause the processor to obtain one or more public key certificates. The control logic also includes a second computer readable program code to cause the processor to identify revocation servers from the one or more public key certificates. The control logic further includes a third computer readable program code to cause the processor to aggregate server information of the identified revocation servers into one or more revocation server lists (RSLs). The control logic includes a fourth computer readable program code to cause the processor to combine the revoked certificates of the one or more RSLs into a unified certificate revocation list (UCRL). The control logic also includes a fifth computer readable program code to cause the processor to a UCRL filter configured to lossy compress the UCRL into a compressed UCRL.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein refer to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Figure 1:
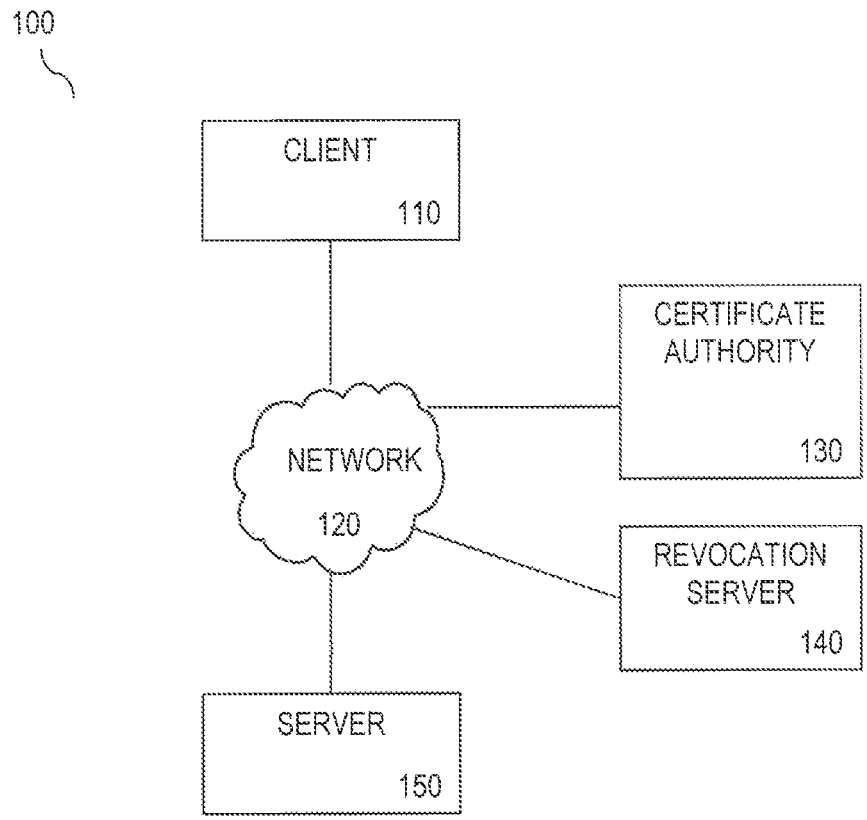
FIG. 1 illustrates an architecture diagram of a system for validating online certificate status.

Online certificates may be used to provide a trusted connection between computers over the Internet. For example, FIG. 1 shows an example of a system 100 for establishing a trusted connection using online certificates. Client 110 may seek to form a secure connection with server 150 over network 120. Client 110 may have a first certificate, or public key certificate, signed by a third party such as a VeriSign® SSL certificate. Certificate authority 130 may provide a second certificate, such as a revocation status certificate, that is used to verify public key certificates. Revocation status certificates may be provided by and verified by one or more parties. Public key certificates are replaced on a regular basis. Other certificates remain in use for extended periods of time. However, revocation status certificates may be replaced or renewed at a higher frequency.

Revocation status certificates are used in combination with public key certificates and need to be valid in order to validate the public key certificate. Certificate verification server 130 may provide validation information, or information whether a revocation status certificate is not valid or revoked. Certificates may be revoked if there has been a security breach or some other security issue. Revocation helps to prevent compromised certificates or fraudulent use of certificates. Some protocols, such as Online Certificate Status Protocol (OCSP), may be used to obtain certificate status information, such as whether the first certificate has been revoked, or whether a revocation status certificate can attest to the current validity of the first certificate.

Certificate revocation lists (CRL) are used to check for certificate revocations. Waiting for the status can cause user discomfort and undermine PKI validation. Embodiments described below can reduce the latency involved in checking CRLs and provide an efficient client-side check of a CRL, usually with no network delay. In addition, the embodiments may significantly reduce the potential for an undetected denial-of-service attack on the revocation system.

Figure 2:
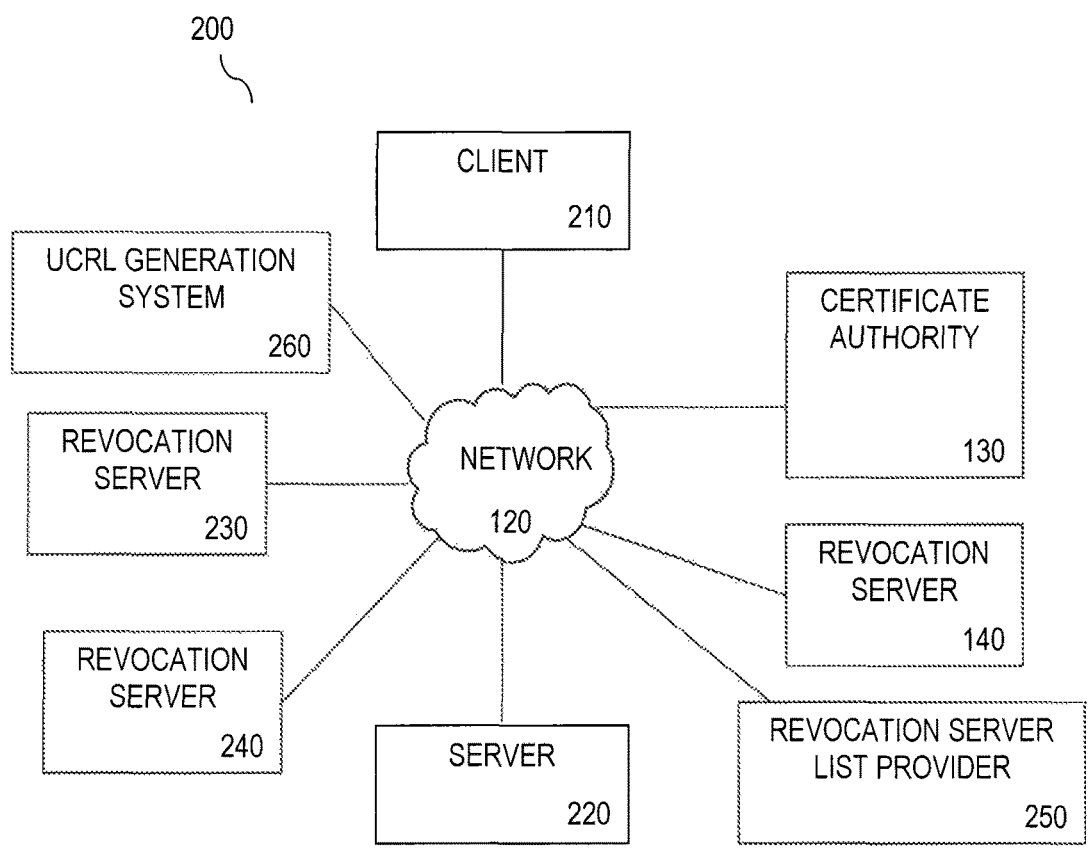
FIG. 2 illustrates a system for generating a unified certificate revocation list according to an embodiment.

FIG. 2 is an architecture diagram of exemplary certificate validation system 200, according to an embodiment. System 200, or any combination of its components, may be part of or may be implemented with one or more computing devices. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

According to an embodiment, system 200 includes client 210 that communicates remotely with other clients or servers over network 120, such as with server 220. System 200 includes revocation server 140 and other revocation servers, such as revocation servers 230 and 240. System 200 may include revocation server list provider 250, which provides revocation server lists (RSLs). System 200 includes UCRL generation system 260, which may be implemented in software, firmware, hardware, or a combination thereof.

Figure 3:
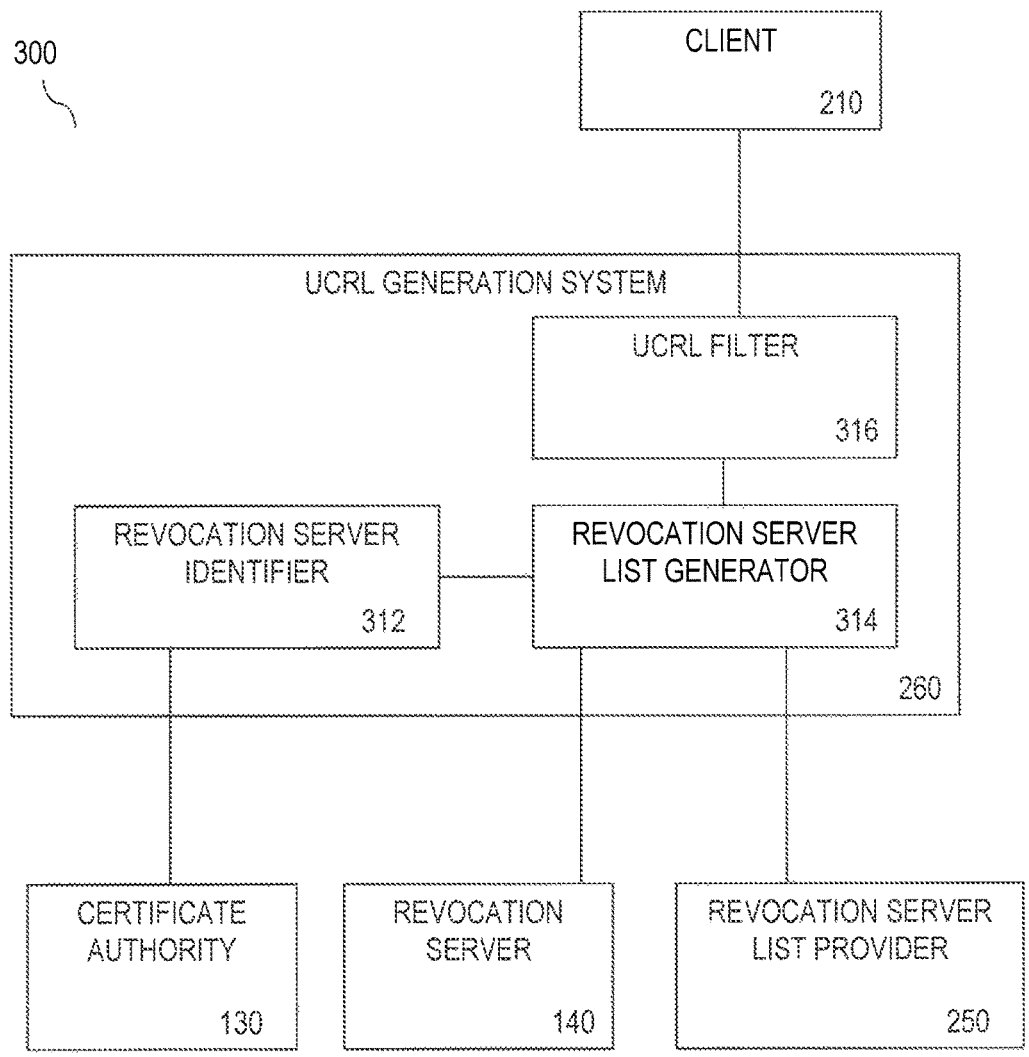
FIG. 3 further illustrates a system for generating a unified certificate revocation list according to an embodiment.

According to the embodiment shown in FIG. 3, UCRL generation system 260 includes revocation server identifier 312, revocation server list generator 314 and UCRL filter 316. Revocation server identifier 312 may be configured to obtain one or more public key certificates. Revocation server identifier is configured to identify revocation servers associated with public key certificates. Public key certificates are typically identified by a certificate authority name or identifier and a serial number unique to the certificate authority. Certificates may have information identifying revocation servers. Revocation server identification may be performed using public key certificate information. According to a further embodiment, a search service in the course of crawling the web may acquire from servers a list of PK certificates (such as SSL certificates). A list of revocation servers may be identified, extracted and aggregated from those certificates. In another embodiment, a reputable browser vendor may place trusted certificates into a browser or operating system. A list of revocation servers may be extracted from these certificates.

Revocation server list generator 314 is configured to aggregate server information of the identified revocation servers into one or more revocation server lists (RSLs). The determined revocation servers may be combined, including with lists of revocation servers provided by organizations that issue certificates. In some embodiments, this list of revocation servers may be reduced in size, such as by retaining a subset of revocation servers known to provide a large proportion or popular portion of the certificates of interest. Popular patterns or user habits may be considered. Such a subset may relate to certificates issued to certain organizations, such as organizations that pay to be included. The resulting list of revocation servers may be referred to as a revocation server list (RSL).

Revocation server list generator 314 is also configured to combine the revoked certificates of the RSLs into a unified certificate revocation list (UCRL). According to an embodiment, a server in an RSL is contacted and the list of currently revoked certificates acquired and aggregated. In some cases, that list may be of actual revoked certificates, or it may be a list of identifying values for such revoked certificates, such as fingerprints, or a serial number plus the name of the certificate authority.

A date or time stamp may be associated with the list, or the list members. For example, a date associated with the most recent contact with a revocation server may be maintained, or a date associated with when the recent aggregation began. A time stamp associated with each RSL may be analyzed to determine whether to add or remove an RSL. The results of successfully aggregating information from RSLs may be included in a UCRL.

UCRLs may be retransmitted to a client (e.g., web browser) periodically, or updated to a client. RSLs may also be transmitted. RSLs may be transmitted by being embedded in a software distribution, such as a browser distribution, an operating system distribution, or as an update. They may be transmitted with identified elements of a larger or previously received list and/or with additions to a previously received list. In some embodiments, the RSLs are transmitted as compressed or encoded versions. Compression may include hashing names of certificate issuing services, and/or revocation server contact information, such as its uniform resource locator (URL). In some cases, time stamps associated with the UCRL may also be transmitted.

UCRLs may be compressed or encoded. UCRL filter 316 may be configured to compress the UCRL into a compressed UCRL. Lossy compression may be used. For example, the list may be compressed using a bloom filter. Entries in the hash table are used to identify hashes of revoked certificates. In that example, incremental updates may, for instance, include lists of hash points that have changed since a last update. Golomb filters may also be used. Such filters may provide for fewer false positives.

Figure 4:
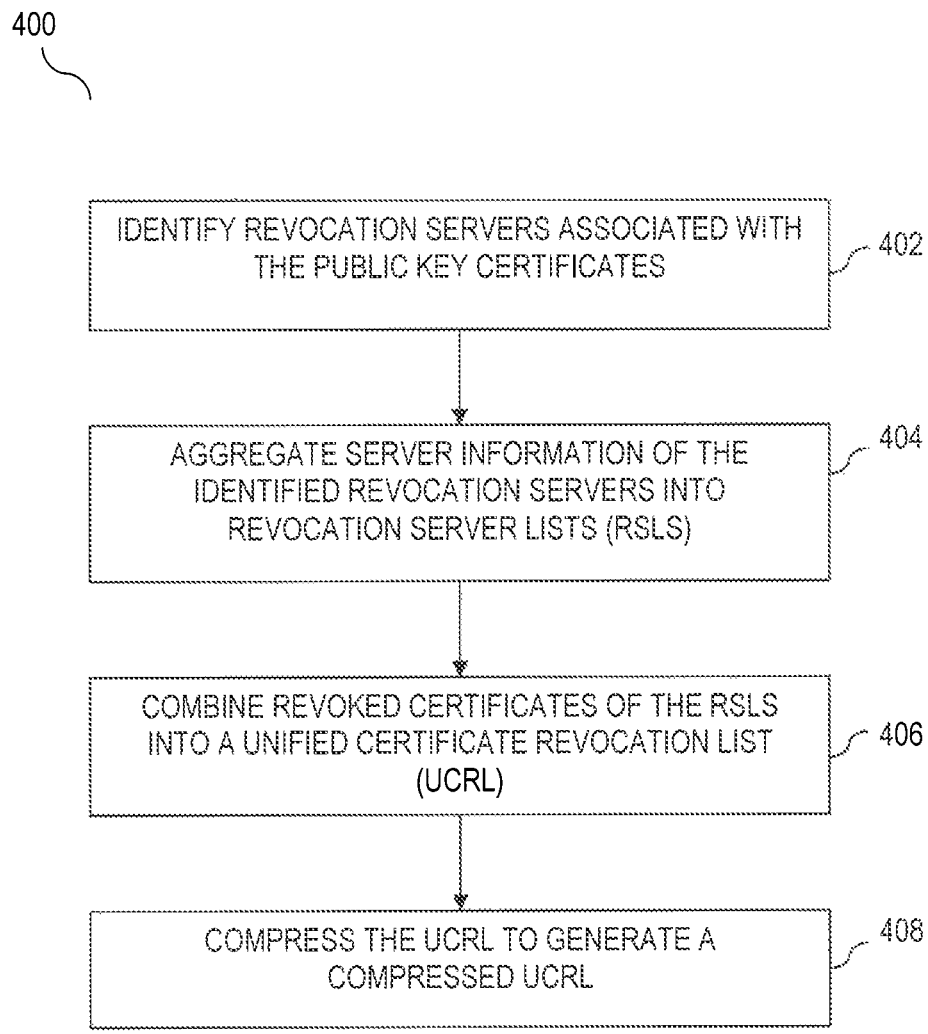
FIG. 4 is a flowchart illustrating a method for generating a unified certificate revocation list according to an embodiment.

FIG. 4 is a flowchart of exemplary method 400 for generating a unified certificate revocation list, according to an embodiment. While method 400 is described with respect to an embodiment, method 400 is not meant to be limiting and may be used in other applications. In an example, method 400 may use one or more components of system 200 of FIG. 2, including UCRL generation system 260. However, method 400 is not meant to be limited to system 200.

As shown in FIG. 4, exemplary method 400 involves public key certificates that may have a value and certificate authority. At step 402, revocation servers associated with public key certificates are identified. Revocation servers may be determined based on information associated with public key certificates.

At step 404, server information of the identified revocation servers are aggregated into one or more revocation server lists. At step 406, revoked certificates of the RSLs may be combined into a unified certificate revocation list. Revoked certificates of RSLs provided by a first certificate issuer may be combined with revoked certificates of RSLs provided by a second certificate issuer.

At step 408, the UCRL is compressed into a compressed UCRL. UCRLs may be reduced in data size or reduced into a subset of revoked certificates. Lossy compression may be used, including the use of bloom filters or a Golomb compressed set. Such filters may efficiently reduce the UCRLs while producing very few false positives, perhaps with an accuracy rate above a threshold of 99%.

A bloom filter will indicate if there is a chance a certificate is in a list. In an embodiment, a bloom filter hashes UCRL information using 32 bit hashes. For example, a bit vector may represent a revoked certificate. There may be such a bit in every hash. Certificates may be hashed in different ways. A browser may then check to see if it is actually there. Filters may be adjusted based on a false alarm rate or hash table size. Some lists may be large and full of expired certificate revocation information. Many of these expired certificates may be selected out affirmatively so that lossy compression algorithms deal with fewer expired certificates.

Steps 402 may be performed by revocation server identifier 312. Steps 404 and 406 may be performed by revocation server list generator 314. Step 408 may be performed by UCRL filter 316.

A client, such as a browser executed on a client computing device, may use a locally received UCRL and RSL to perform improved testing of the revocation status of a certificate. A UCRL manager may be configured to obtain a compressed UCRL having revoked certificates combined from one or more RSLs. A UCRL comparator may be configured to compare a certificate to the compressed UCRL to determine revocation status for the current certificate. A connection corresponding to the current certificate will be established when revocation of the current certificate is not found in the compressed UCRL.

Figure 5:
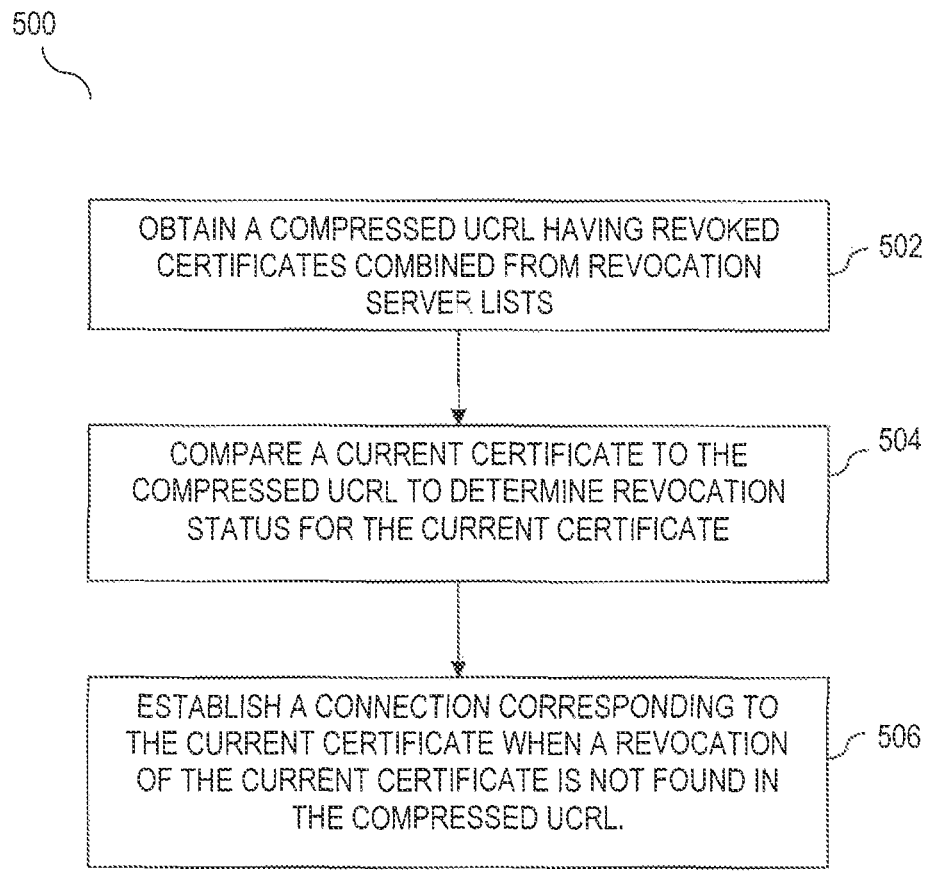
FIG. 5 is a flowchart illustrating a method for determining revocation status, according to an embodiment.

FIG. 5 is a flowchart of exemplary method 500 for determining revocation status, according to an embodiment. While method 500 is described with respect to an embodiment, method 500 is not meant to be limiting and may be used in other applications. Method 500 may use one or more components, such as a UCRL manager and UCRL comparator. Method 500 is not meant to be limited to these components.

As shown in FIG. 5, exemplary method 500 involves compressed UCRLs having revocation status of public key certificates. The public key certificates may be identified in a UCRL using certificate information, such as certificate information corresponding to a certificate identifier value and a certificate authority. At step 502, a compressed UCRL having revoked certificates combined from one or more revocation server lists is obtained.

At step 504, a current certificate related to a future request to connect to another computer is compared to the compressed UCRL to determine revocation status for the current certificate. At step 506, a connection to the computer corresponding to the current certificate is established when a revocation of the current certificate is not found in the compressed UCRL.

Some example scenarios are provided. In some of the following examples, it is assumed PKI links have been validated from a certificate in question to a root of trust, before, during, or after the UCRL and RSL lists have been consulted.

In a first additional example, if a certificate C-1 has been validated via PKI links to trusted root certificate authority CA, then local comparison with a RSL and UCRL may often expedite a test for revocation. In that example, if the certificate C-1 includes specification of a revocation server which is in the known RSL, and if the UCRL does not mention the certificate C-1, then the certificate may be assumed to be valid, potentially without additional contact with C-1's associated revocation server. In that example, if the UCRL was compressed in a bloom filter, and the hash associated with C-1 was not found in the hash tables, then the certificate may similarly be assumed to valid.

In a second example, if the revocation server for a certificate C-2 was not in the RSL, then traditional revocation server checking may (slowly) proceed as usual. As a third example, if a certificate C-3 is found in the UCRL, then it may be known that the certificate has been revoked. As a fourth example, if a certificate C-4 is found in a compressed list, such as a bloom filter compression, then it may be assumed that the certificate is probably revoked. In that example, traditional (slow) revocation server checking may proceed, and stricter enforcement of validation may take place. In that example, stricter enforcement may include refusing to accept the certificate if the stated revocation server is unreachable.

In some embodiments, when a client has not received an UCRL within a certain time frame, such as within the past hour, or within the past day, traditional revocation server contact may be used, unless the last UCRL contains revocation information asserting a certificate had been revoked.

In some embodiments, more than one trusted supplier of an RSL and UCRL pair, such as RSL provider 250, may provide data to a client. In that case, users/clients that did not want to trust only one supplier would have redundant sources of revocation (atop the underlying revocation server response). The described embodiments may provide for less latency and more reliable PKI validation.

Aspects of the embodiments for exemplary systems 200-300 and/or methods 400-500 or any part(s) or function(s) thereof may be implemented using hardware, software modules, firmware, tangible computer readable or computer usable storage media having instructions stored thereon, or a combination thereof and may be implemented in one or more computer systems or other processing systems.

Embodiments may be directed to a computer readable storage medium comprising software stored on any computer useable medium. Such software, when executed in one or more data processing devices, causes a data processing device(s) to operate as described herein. Embodiments employ any computer useable or readable medium.

Examples of non-transitory computer readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Additional computer readable medium can include communication mediums (e.g., wired and wireless communications networks, local area networks, wide area networks, intranets, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method implemented by a unified certificate revocation list (UCRL) generation server, the method comprising:
   identifying a plurality of revocation servers associated with one or more public key certificates, wherein the identifying is implemented by one or more processor-based computing devices;
   aggregating, by the UCRL generation server, server information of the identified plurality of revocation servers into one or more revocation server lists (RSLs);
   combining revoked certificates associated with the one or more RSLs into a UCRL;
   generating a compressed UCRL that comprises a respective hash of each of the revoked certificates of the UCRL, wherein each of the revoked certificates is identifiable from the respective hash without decompressing the compressed UCRL;
   generating one or more compressed RSLs from the one or more RSLs by adding a respective hash of respective revocation server contact information of each of the identified plurality of revocation servers of the one or more RSLs into the one or more compressed RSLs; and
   transmitting, by the UCRL generation server and over a network, the one or more compressed RSLs and the compressed UCRL to a client device without receiving a request therefor.

2. The method of claim 1, wherein generating the compressed UCRL comprises performing lossy compression.

3. The method of claim 2, wherein generating the compressed UCRL comprises filtering using a bloom filter.

4. The method of claim 1, wherein generating the compressed UCRL comprises filtering using a Golomb compressed set.

5. The method of claim 1, wherein generating the compressed UCRL comprises reducing a data size of the UCRL.

6. The method of claim 1, wherein combining includes combining revoked certificates of the one or more RSLs provided by a first certificate issuer with revoked certificates of RSLs provided by a second certificate issuer.

7. The method of claim 1, further comprising reducing the UCRL into a subset of revoked certificates.

8. The method of claim 1, wherein identifying includes identifying a value and certificate authority for each of the one or more public key certificates.

9. The method of claim 1, wherein combining includes analyzing a time stamp associated with each RSL to determine whether to add or remove an RSL.

10. The method of claim 1, further comprising periodically retransmitting the compressed UCRL to the client device without receiving requests therefor.

11. The method of claim 1, wherein the client device determines whether a certificate has been revoked without contacting any of the plurality of revocation servers based at least in part on whether a hash of the certificate is stored in the compressed UCRL, whether a hash of a specification of a revocation server contained in the certificate is stored in the one or more compressed RSLs, and whether an amount of time since the compressed UCRL was received is less than a threshold time frame.

12. A computer program product comprising instructions stored in a non-transitory computer-readable storage medium, the instructions comprising:
   instructions to obtain one or more public key certificates;
   instructions to identify revocation servers from the one or more public key certificates;
   instructions to aggregate server information of the identified revocation servers into one or more revocation server lists (RSLs);
   instructions to combine revoked certificates associated with the identified revocation servers of the one or more RSLs into a unified certificate revocation list (UCRL);
   instructions to generate a compressed UCRL that comprises a respective hash of each of the revoked certificates of the UCRL, wherein each of the revoked certificates is identifiable from the respective hash without decompressing the compressed UCRL; and
   instructions to transmit the compressed UCRL and the one or more RSLs to a client device over a network.

13. A computer-implemented method comprising:
   receiving, by a processor-based client device from a server, a compressed unified certificate revocation list (UCRL) storing hashes of revoked certificates, the revoked certificates being associated with one or more revocation server lists (RSLs), each of the one or more RSLs identifying a plurality of revocation servers;
   hashing a current certificate to generate a hash of the current certificate;
   determining, using the processor-based client device, whether the hash of the current certificate is stored in the compressed UCRL to determine revocation status for the current certificate without decompressing the compressed UCRL; and
   establishing, by the processor-based client device, a connection corresponding to the current certificate when a revocation of the current certificate is not found in the compressed UCRL and the current certificate was received within a time frame of receiving the compressed UCRL from the server.

14. The method of claim 13, further comprising:
receiving, from the server, the one or more RSLs;
determining whether the current certificate comprises a specification of a revocation server that is identified by the one or more RSLs; and
determining that the current certificate is valid without contacting any of the plurality of revocation servers when the revocation of the current certificate is not found in the compressed UCRL, the current certificate comprises the specification of the revocation server that is identified by the one or more RSLs, and the current certificate was received within the time frame of receiving the compressed UCRL.

15. A unified certificate revocation list (UCRL) generation system comprising:
a revocation server identifier configured to:
identify revocation servers associated with one or more public key certificates;
a revocation server list generator, implemented by one or more processor-based computing devices, configured to:
aggregate server information of the identified revocation servers into one or more revocation server lists (RSLs); and
combine revoked certificates from the identified revocation servers of the one or more RSLs into a UCRL; and
a UCRL filter configured to generate a compressed UCRL that comprises a respective hash of each of the revoked certificates of the UCRL, wherein each of the revoked certificates is identifiable from the respective hash without decompressing the compressed UCRL, and to transmit the compressed UCRL to a client device over a network without receiving a request therefor.

16. The system of claim 15, wherein the UCRL filter is further configured to perform lossy compression.

17. The system of claim 16, wherein the UCRL filter is further configured to perform bloom filtering.

18. The system of claim 15, wherein the UCRL filter is further configured to filter using a Golomb compressed set.

19. The system of claim 15, wherein the UCRL filter is further configured to reduce a data size of the UCRL.

20. The system of claim 15, wherein the revocation server identifier is further configured to search for the one or more public key certificates.

21. The system of claim 15, wherein the revocation server list generator is further configured to combine revoked certificates of the one or more RSLs provided by a first certificate issuer with revoked certificates of RSLs provided by a second certificate issuer.

22. The system of claim 15, wherein the UCRL filter is further configured to reduce the UCRL into a subset of revoked certificates.

23. The system of claim 15, wherein the revocation server identifier is further configured to identify a value and certificate authority for each of the one or more public key certificates.

24. The system of claim 15, wherein the revocation server list generator is further configured to analyze a time stamp associated with each RSL to determine whether to add or remove an RSL.

25. The system of claim 15, further comprising a UCRL comparator configured to compare a hash of a certificate to the hash of each of the revoked certificates in the compressed UCRL to test for revocation.

26. A system comprising:
a unified certificate revocation list (UCRL) manager configured to obtain a compressed UCRL having hashes of revoked certificates, the revoked certificates being combined from revocation servers identified by one or more revocation server lists (RSLs);
a UCRL comparator, implemented by a processor-based computing device, configured to:
hash a current certificate to create a hash of the current certificate; and
determine whether the hash of the current certificate is stored in the compressed UCRL to determine revocation status for the current certificate without decompressing the compressed UCRL, wherein a connection corresponding to the current certificate is established when revocation of the current certificate is not found in the compressed UCRL, and a period of time between obtaining the compressed UCRL and receiving the current certificate does not exceed a threshold time frame.

27. The computer program product of claim 12, wherein the instructions to transmit the compressed UCRL and the one or more RSLs to the client device over the network further comprises instructions to transmit, over the network, the compressed UCRL and the one or more RSLs to a web browser application of the client device.

* * * * *